(12) United States Patent
Shih et al.

(10) Patent No.: US 8,223,434 B2
(45) Date of Patent: Jul. 17, 2012

(54) IMAGING LENS SYSTEM WITH TWO LENSES

(75) Inventors: Bo-Yuan Shih, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 13/029,652

(22) Filed: Feb. 17, 2011

(65) Prior Publication Data

US 2012/0120504 A1 May 17, 2012

(30) Foreign Application Priority Data

Nov. 16, 2010 (TW) ................................ 99139429 A

(51) Int. Cl.
*G02B 25/00* (2006.01)
*G02B 3/02* (2006.01)
(52) U.S. Cl. ........ 359/646; 359/661; 359/717; 359/739; 359/793; 359/795
(58) Field of Classification Search .................. 359/646, 359/661, 717, 739, 793, 795
See application file for complete search history.

(56) References Cited

U.S. PATENT DOCUMENTS

| 5,835,288 | A | 11/1998 | Yamada et al. |
| 6,876,500 | B1 | 4/2005 | Sato |
| 7,088,528 | B2 | 8/2006 | Sato |
| 7,110,190 | B2 | 9/2006 | Do et al. |
| 2004/0160680 | A1 | 8/2004 | Shinohara |
| 2005/0073753 | A1 | 4/2005 | Sato |
| 2008/0030875 | A1 | 2/2008 | Nishizawa |
| 2010/0053778 | A1* | 3/2010 | Saito ............................ 359/795 |

FOREIGN PATENT DOCUMENTS

| CN | 101046544 A | 3/2007 |
| EP | 1302801 A1 | 4/2003 |
| EP | 1793252 A1 | 6/2007 |
| EP | 1793254 A1 | 6/2007 |
| JP | 8-334684 | 12/1996 |
| JP | 2004177976 A | 6/2004 |
| JP | 2005107368 A | 4/2005 |
| JP | 2006-154517 A | 6/2006 |
| JP | 2006189586 A | 7/2006 |
| JP | 2007156031 A | 6/2007 |
| TV | I266074 | 11/2006 |
| TW | I232325 | 5/2005 |
| TW | M320680 | 10/2007 |

* cited by examiner

*Primary Examiner* — Evelyn A. Lester
(74) *Attorney, Agent, or Firm* — Muncy, Geissler, Olds & Lowe, PLLC

(57) ABSTRACT

An imaging lens system with two lenses is provided. The imaging lens system with two lenses, along an optical axis from an object side to an image side, comprises an aperture stop; a first lens having positive refractive power and being a biconvex lens; and a second lens having negative refractive power and being a meniscus lens with a concave surface on the object side and a convex surface on the image side.

9 Claims, 7 Drawing Sheets

IMAGING LENS SYSTEM WITH TWO LENSES

BACKGROUND OF THE INVENTION

The present invention relates to an imaging lens system with two lenses, especially to an imaging lens system for mobile phones or mini-cameras with image sensors such as CCD (Charge Coupled Device) or CMOS (Complementary Metal Oxide Semiconductor). The imaging lens system is formed by two lenses with features of long back focal length and low cost.

The electronics available now become more compact and multifunctional. Most of them such as digital cameras, PC (personal computer) cameras, network cameras and mobile phones, even personal digital assistants (PDA) are equipped with an image lens system. The imaging lens system not only requires good imaging quality but also needs compact volume and lower cost. Moreover, the imaging lens system with larger field angle can improve image quality of the electronics and match users' requirements.

There are various designs such as two lenses, three lenses, four lenses or five lenses of the imaging lens system applied to mini electronics. Yet while a compromise of resolution and cost, the two lenses is preferred.

There are various structures of conventional two lenses imaging lens system and the difference among them or technical character is in the shape of the two lenses, location of the convex surface/concave surface, positive/negative refractive power, or relative optical parameters. Among these designs, the combination of a first lens with positive refractive power and a second lens with positive refractive power can achieve requirement of minimized volume, such as prior arts revealed in US2005/0073753, US2004/0160680, U.S. Pat. No. 7,110,190, U.S. Pat. No. 7,088,528, US2004/0160680, EP1793252, EP1302801, JP2007-156031, JP2006-154517, JP2006-189586, TWM320680, TWI232325, and CN101046544 etc.

However, the volume of these imaging lens systems still requires further improvement. For larger field angle, the imaging lens system in US2008/0030875 includes a lens with positive refractive power and a lens with negative refractive power, the imaging lens system in U.S. Pat. No. 5,835,288 is formed by combinations of biconcave lenses and biconvex lenses, the systems in JP08-334684, JP2005-107368 use combinations of positive/positive refractive power or negative/positive refractive power. Or as shown in JP2004-177976, EP1793252, EP1793254, U.S. Pat. No. 6,876,500, US2004/0160680, U.S. Pat. No. 7,088,528, TWI266074, the combination of the lens with positive refractive power and the lens with positive refractive power.

A common feature of the imaging lens systems described above is that the back focal length is short. The disadvantage of short back focal length is when the electronics become more compact, the imaging lens systems will become more compact with the electronics; therefore, the back focal length is getting shorter with the proportion of the imaging lens systems. Besides the lenses, the imaging lens system also includes a IR (infrared) cut-off filter and a glass. Because thickness of the IR cut-off filter and the glass is fixed, when the imaging lens system becomes more compact, the back focal length that gets shorter with the proportion of the imaging lens system is short enough to dispose the IR cut-off filter and the glass.

Therefore, the users require the imaging lens system with long back focal length. The present invention provides a better design of the imaging lens system applied to electronics such as mini cameras and camera phones.

SUMMARY OF THE INVENTION

In view of the problems in the art above, the object of the present invention is to provide an imaging lens system with two lenses, along an optical axis from an object side to an image side, comprising: an aperture stop; a first lens having positive refractive power and being a biconvex lens; and a second lens having negative refractive power and being a meniscus lens with a concave surface on the object side and a convex surface on the image side.

The imaging lens system with two lenses can further satisfy an equation:

$$0.42 \leq BFL/TL \leq 0.57 \tag{1}$$

wherein BFL is back focal length of the imaging lens system, and TL is distance from the aperture stop to an image plane.

The first lens of the imaging lens system with two lenses can further satisfy equations:

$$1.48 \leq N_{d1} \leq 1.61 \tag{2}$$

$$53.00 \leq v_{d1} \leq 62.00 \tag{3}$$

wherein $N_{d1}$ is refractive index of the first lens, and $v_{d1}$ is Abbe's number of the first lens.

The second lens of the imaging lens system with two lenses can further satisfy equations:

$$1.58 \leq N_{d2} \leq 1.71 \tag{4}$$

$$27.00 \leq v_{d2} \leq 29.00 \tag{5}$$

wherein $N_{d2}$ is refractive index of the second lens, and $v_{d2}$ is Abbe's number of the second lens.

Further, the first lens can include at least one inflection point within effective diameter range from a lens center to edge thereof, and the inflection point satisfies the equation:

$$95\% \leq H_v/H_t \leq 99\% \tag{6}$$

wherein $H_+$ is perpendicular distance from the inflection point on the object side of the first lens to the optical axis, and $H_t$ is perpendicular distance from the maximum optical effective point on the object side of the first lens to the optical axis.

The imaging lens system with two lenses can further satisfy an equation:

$$0.44 \leq f_1/f \leq 0.60 \tag{7}$$

wherein $f_1$ is effective focal length of the first lens, and f is effective focal length of the imaging lens system with two lenses.

The imaging lens system with two lenses can further satisfy an equation:

$$-5.20 \leq f_2/f \leq 1.00 \tag{8}$$

wherein $f_2$ is effective focal length of the second lens, and f is effective focal length of the imaging lens system with two lenses.

Both the object side and the image side of the first lens can be aspherical surfaces.

Both the object side and the image side of the second lens can be aspherical surfaces.

Both the first lens and the second lens are made from plastic.

DETAILED DESCRIPTION OF THE PREFERRED EMBODIMENT

Figure 1:
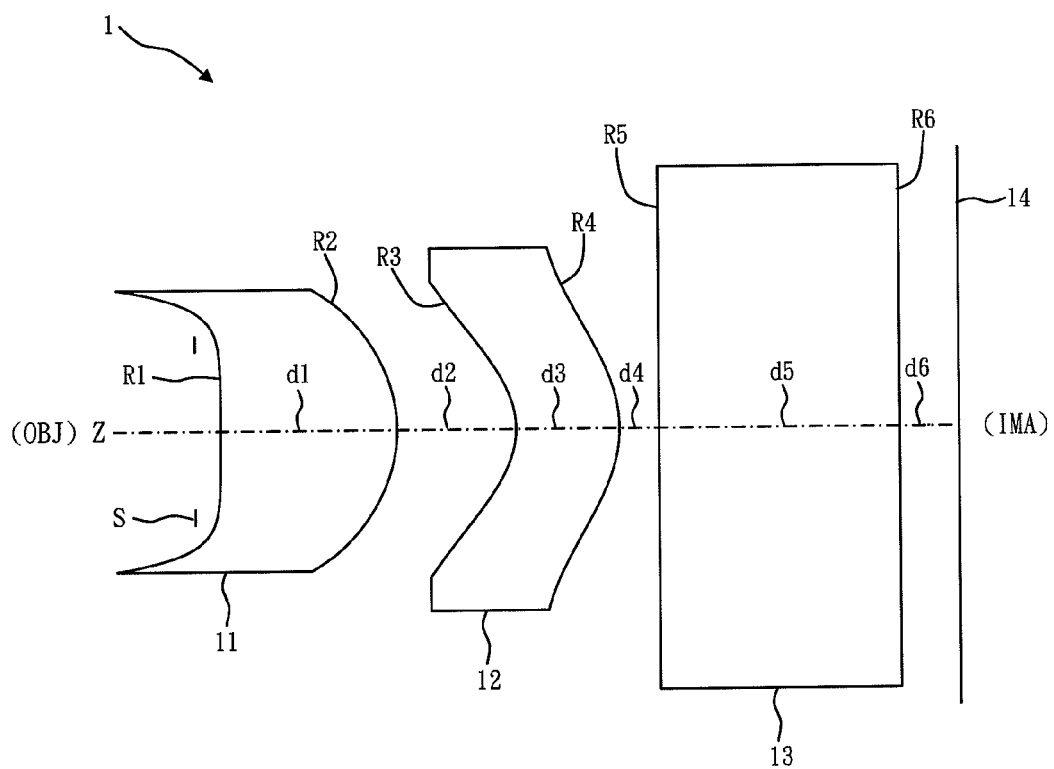
FIG. 1 is a schematic drawing showing a structure of an image lens system with two lenses according to the present invention.

Refer to FIG. 1, along an optical axis Z from an object side to an image side, an imaging lens system 1 according to the present invention includes an aperture stop S, a first lens 11, a second lens 12, an IR (infrared) cut-off filter 13, and an image sensor 14.

The first lens 11 is a biconvex lens with positive refractive power. The first lens 11 is made from plastic whose refractive index ($N_d$) is larger than 1.5. Moreover, both the object side R1 and the image side R2 of the first lens 11 are aspherical surfaces.

The second lens 12 is a meniscus lens with negative refractive power, and the surface on the object side R3 is a concave surface while the surface on the image side R4 is a convex surface. The second lens 12 is made from plastic whose refractive index ($N_d$) is larger than 1.6. Both the object side R3 and the image side R4 of the second lens 12 are aspherical surfaces.

The aperture stop S is a front-positioned aperture that can be attached on an object side surface R1 of the first lens 11. The IR cut-off filter 13 is a lens or a film filtering IR light and formed by coating. The image sensor 14 is a CCD or a CMOS.

While capturing images, light from the object passes the first lens 11, the second lens 12, and the IR cut-off filter 13 to form an image on the image sensor 14. Through optical combinations of the radius of curvature of the optical surface and the aspherical surfaces of the first lens 11 as well as the second lens 12, the lens thickness (d1, d3) and the air gap (d2, d4), the back focal length can be longer.

The aspherical Surface Formula is the following equation (9):

$$Z = \frac{ch^2}{1+\sqrt{(1-(1+K)c^2h^2)}} + A_4h^4 + A_6h^6 + A_8h^8 + A_{10}h^{10} + A_{12}h^{12} \quad (9)$$

wherein
c is a radius of curvature,
h represents height of the lens,
K is a conic constant, and
$A_4 \sim A_{12}$ respectively are 4th, 6th, 8th, 10th, and 12th order aspherical coefficient.

According to the above structure, the imaging lens system 1 of the present invention has longer back focal length, and the imaging lens system satisfies any one of the equation (1) to equation (8). Furthermore, the aberration is further corrected and the chief ray angle is reduced.

Figure 2:
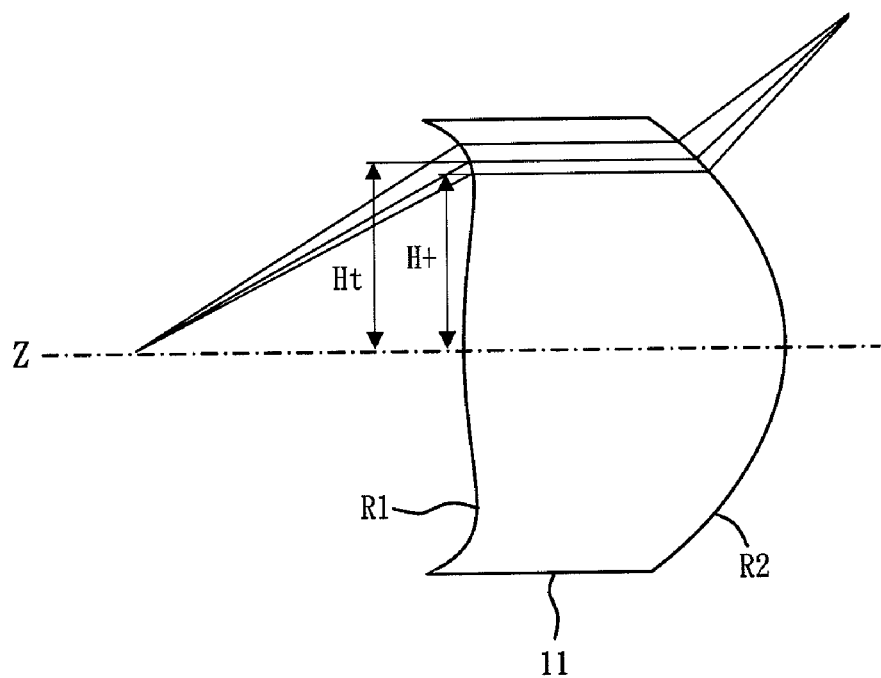
FIG. 2 is a schematic drawing showing a structure of an object side of a first lens according to another embodiment of the present invention.

Refer to FIG. 2, which is schematic drawing showing a structure of the object side of the first lens 11 according to another embodiment of the present invention. The surface on the object side R1 in the effective diameter range from a lens center to an edge can include at least one inflection point that may change the refractive power of the first lens 11 from positive to negative. The cross section of the object side R1 of the first lens 11 includes a convex center while the two sides are concave and the shape looks like a "M" shape. That means the curvature of the wavy object side R1 gradually changes from the center area to the peripheral area and turns into a concave surface so that an inflection point forms.

When a tangent line passes the inflection point and intersects with the optical axis, the distance from the inflection point to the optical axis is lens height within positive refractive power range labeled as $H_+$. That's the distance (length between) from the inflection point to its intersection point of the optical axis. The distance from the maximum optical effective point of the first lens 11 to the optical axis is labeled as $H_t$. The ratio of $H_+$ to $H_t$ represents the range of change of the refractive power. In order to have better image, the preferred ratio should be larger than 50%. Besides, for wide-angle effect, the preferred ratio is larger than 75%, Refer to tables of each embodiment below: the table includes data of optical surface number in order from the object side to the image side, the radius of curvature R (mm) of each optical surface on the optical axis, the on-axis surface spacing d (mm) of each optical surface, the refractive index $N_d$ of the lens and the Abbe's number $v_d$ of the lens. The optical surface of the lens labeled with * represents an aspherical surface. Fno, f, FOV represent aperture value (f number), effective focal length and maximum field angle of the imaging lens system 1, respectively.

The First Embodiment

Figure 3:
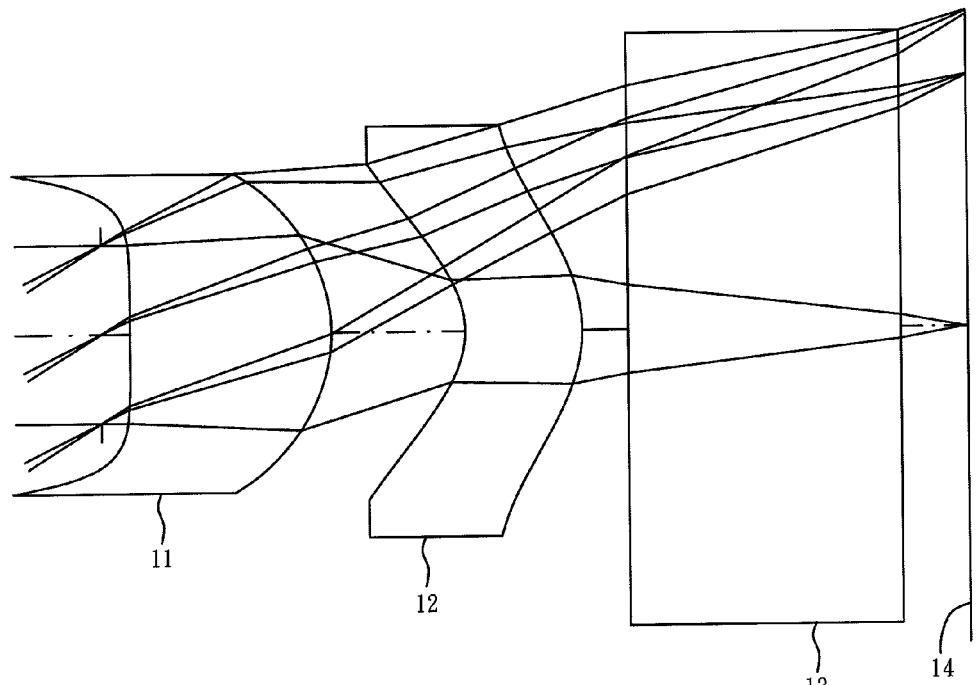
FIG. 3 is a schematic drawing showing light path of the image lens system with two lenses according to the first embodiment of the present invention.
Figure 4A:
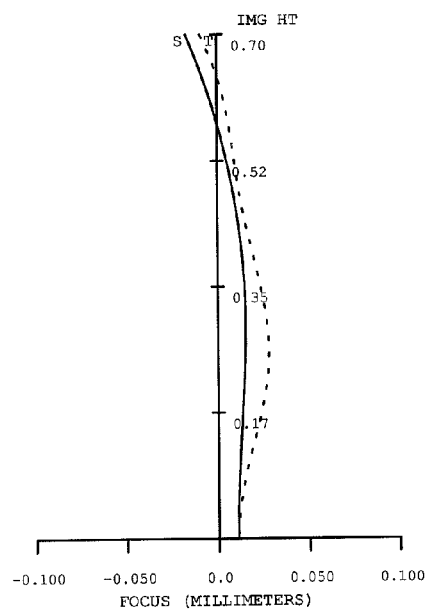
FIGS. 4A and 4B are drawings showing field curvature and distortion of an image according to the first embodiment of the present invention.
Figure 4B:
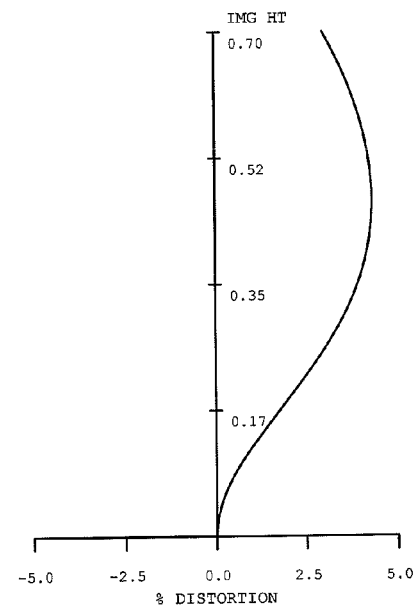

Refer to FIG. 3 & FIGS. 4A and 4B, which show the structure and optical path, and field curvature and distortion of the imaging lens system with two lenses, respectively.

TABLE 1

Fno = 2.8   f = 1.1093   FOV = 63.3

| optical surface | radius of curvature R (mm) | spacing d (mm) | refractive index $N_d$ | Abbe's number $v_d$ |
|---|---|---|---|---|
| 1 OBJ |  | 500 |  |  |
| STOP |  | 0.0641 |  |  |
| 2 R1* | 16.9535 | 0.4494 | 1.50 | 55.00 |
| 3 R2* | −0.3545 | 0.2998 |  |  |
| 4 R3* | −0.2034 | 0.2609 | 1.60 | 29.30 |
| 5 R4* | −0.3213 | 0.1000 |  |  |
| 6 IR/CG | ∞ | 0.6100 |  |  |
| 7 |  | 0.1483 |  |  |
| 8 IMA |  |  |  |  |

*represents an aspherical surface

TABLE 2

| optical surface | k | A4 | A6 | A8 | A10 | A12 |
|---|---|---|---|---|---|---|
| R1* | 0.0000E+00 | −2.6355E+00 | −3.2319E+01 | 1.5899E+02 | −6.4583E+03 | 5.7318E−06 |
| R2* | −7.7385E−01 | −1.2580E−01 | −2.1065E+00 | −1.4476E+02 | 1.2074E+03 | −6.0452E+03 |
| R3* | −8.9528E−01 | 7.8106E+00 | 6.1543E+01 | −9.2947E+02 | 5.0029E+03 | −9.4316E+03 |
| R4* | −6.3891E−01 | 3.7300E+00 | 1.5196E+01 | −1.0402E+01 | −3.0468E+02 | 1.0331E+03 |

In this embodiment, the first lens 11 is made from plastic with the refractive index $N_{d1}$ of 1.50 and Abbe's number $v_{d1}$ of 55.00 while the second lens 12 is made from plastic with the refractive index $N_{d2}$ of 1.60 and Abbe's number $v_{d2}$ of 29.30. The IR cut-off filter 13 is made from BK7 (a glass material name).

The f is 1.1093 mm, $f_1$ is 0.6900 mm, $f_2$ is −5.5673 mm, TL is 1.9325 mm, and BFL is 0.8583 mm, satisfying from the equations (1)~(5) and the equations (7)~(8).

| | |
|---|---|
| BFL/TL | 0.4441 |
| $N_{d1}$ | 1.50 |
| $v_{d1}$ | 55.00 |
| $N_{d2}$ | 1.60 |
| $v_{d2}$ | 29.30 |
| $f_1/f$ | 0.6220 |
| $f_2/f$ | −5.0185 |

According to the tables 1 and 2 and FIGS. 3, 4A and 4B, the imaging lens system with two lenses can correct the aberration and can achieve the high resolution and long back focal length.

The Second Embodiment

Figure 5:
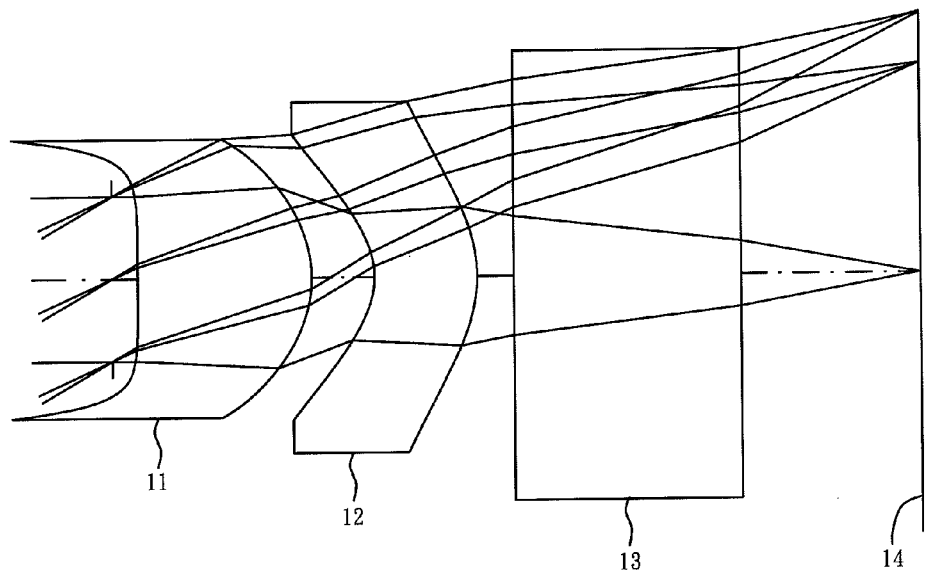
FIG. 5 is a schematic drawing showing light path of the image lens system with two lenses according to second embodiment of the present invention.
Figure 6A:
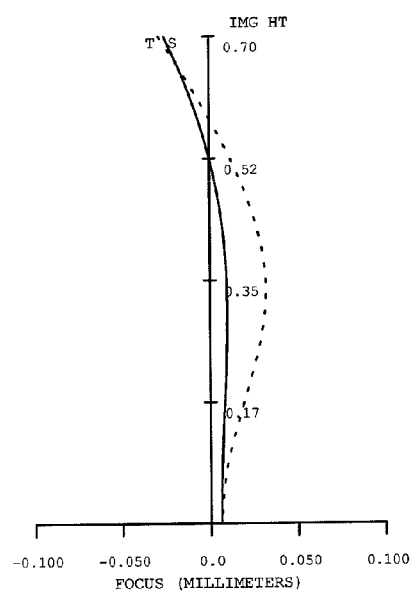
FIGS. 6A and 6B are drawings showing field curvature and distortion of an image according to the second embodiment of the present invention.
Figure 6B:
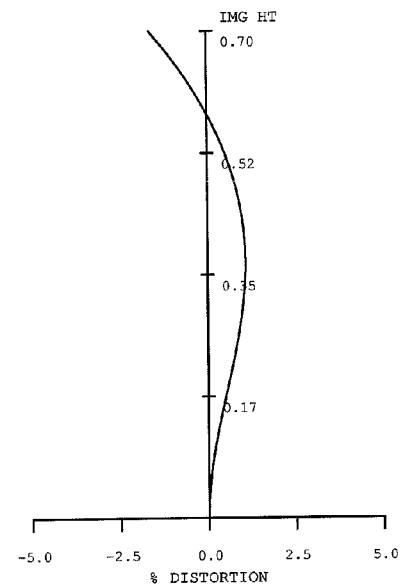

Refer to FIG. 5 & FIGS. 6A and 6B, which show the structure and optical path, and field curvature and distortion of the imaging lens system with two lenses, respectively.

TABLE 3

| | Fno = 2.8 | f = 1.2348 | FOV = 60.0 | | |
|---|---|---|---|---|---|
| optical surface | radius of curvature R (mm) | spacing d (mm) | refractive index $N_d$ | Abbe's number $v_d$ | |
| 1 OBJ | | 500 | | | |
| STOP | | 0.0692 | | | |
| 2 R1* | 21.7465 | 0.4692 | 1.50 | 55.00 | |
| 3 R2* | −0.3212 | 0.1698 | | | |
| 4 R3* | −0.2154 | 0.2767 | 1.60 | 29.30 | |
| 5 R4* | −0.3857 | 0.1000 | | | |
| 6 IR/CG | ∞ | 0.6100 | | | |
| 7 | | 0.4837 | | | |
| 8 IMA | | | | | |

*represents an aspherical surface

TABLE 4

| optical surface | k | A4 | A6 | A8 | A10 | A12 |
|---|---|---|---|---|---|---|
| R1* | 0.0000E+00 | −2.1203E+00 | −1.7358E+01 | −5.0000E+01 | −5.0000E+01 | −3.1415E+04 |
| R2* | −9.3935E−01 | 1.0122E+00 | −2.3722E+00 | −1.1362E+02 | 4.2459E+02 | −1.5082E+03 |
| R3* | −7.8061E−01 | 1.0077E+01 | 2.1900E+01 | −4.2825E+02 | 2.0424E+03 | −1.0000E+03 |
| R4* | −6.7648E−01 | 2.5514E+00 | 7.5903E+00 | −2.8815E+01 | −4.9418E+01 | 2.9694E+02 |

In this embodiment, the first lens 11 is made from plastic with the refractive index $N_{d1}$ of 1.50 and Abbe's number $v_{d1}$ of 55.00 while the second lens 12 is made from plastic with the refractive index $N_{d2}$ of 1.60 and Abbe's number $v_{d2}$ of 29.30. The IR cut-off filter 13 is made from BK7 (a glass material name).

The f is 1.2348 mm, $f_1$ is 0.6301 mm, $f_2$ is −2.0811 mm, TL is 2.1786 mm, and BFL is 1.1937 mm, satisfying from the equations (1)~(5) and the equations (7)~(8).

| | |
|---|---|
| BFL/TL | 0.5479 |
| $N_{d1}$ | 1.50 |
| $v_{d1}$ | 55.00 |
| $N_{d2}$ | 1.60 |
| $v_{d2}$ | 29.30 |
| $f_1/f$ | 0.5103 |
| $f_2/f$ | −1.6854 |

According to the tables 3 and 4 and FIGS. 5, 6A, and 6B, the imaging lens system with two lenses can correct the aberration and can achieve the high resolution and long back focal length.

The Third Embodiment

Figure 7:
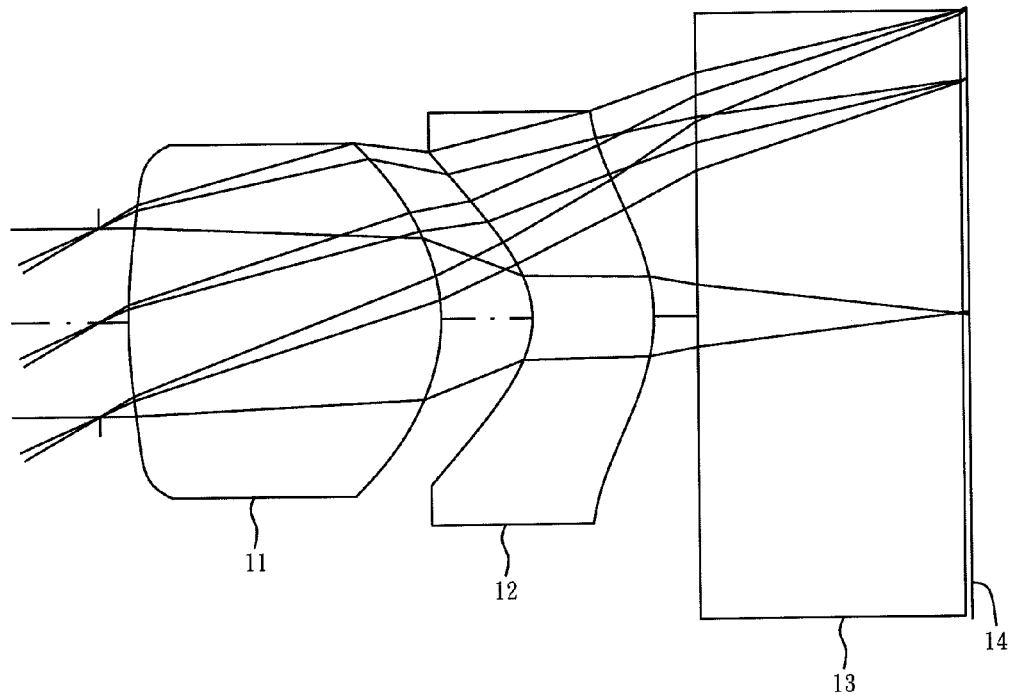
FIG. 7 is a schematic drawing showing light path of the image lens system with two lenses according to third embodiment of the present invention.
Figure 8A:
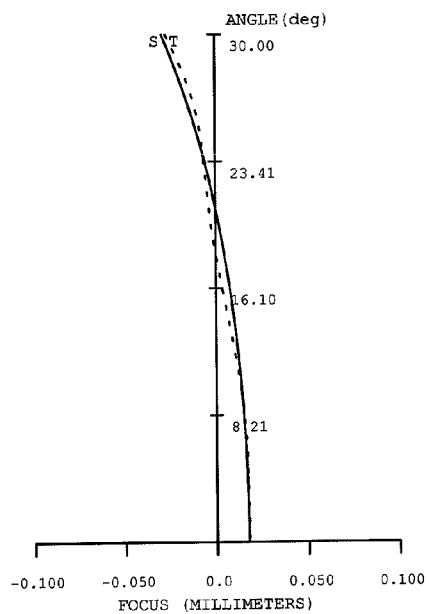
FIGS. 8A and 8B are drawings showing field curvature and distortion of an image according to the third embodiment of the present invention.
Figure 8B:
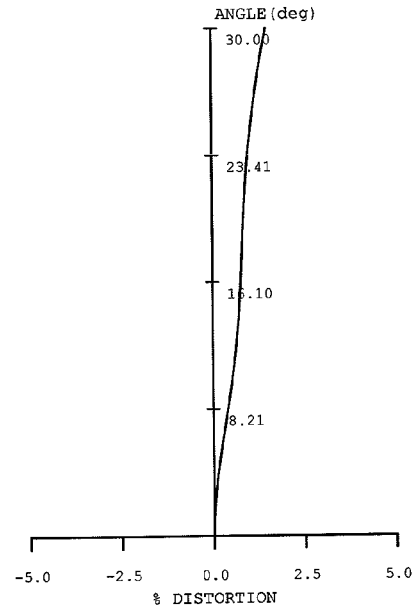

Refer to FIG. 7 & FIGS. 8A and 8B, which show the structure and optical path, and field curvature and distortion of the imaging lens system with two lenses, respectively.

TABLE 5

| | Fno = 2.8 | f = 1.2123 | FOV = 60.0 | | |
|---|---|---|---|---|---|
| optical surface | radius of curvature R (mm) | spacing d (mm) | refractive index $N_d$ | Abbe's number $v_d$ | |
| 1 OBJ | | 500 | | | |
| STOP | | 0.0675 | | | |
| 2 R1* | 1.2484 | 0.7218 | 1.58 | 59.39 | |
| 3 R2* | −0.4148 | 0.2107 | | | |
| 4 R3* | −0.2121 | 0.2800 | 1.69 | 31.08 | |
| 5 R4* | −0.4163 | 0.1000 | | | |
| 6 IR/CG | ∞ | 0.6100 | | | |
| 7 | | 0.0150 | | | |
| 8 IMA | | | | | |

*represents an aspherical surface

TABLE 6

| optical surface | k | A4 | A6 | A8 | A10 | A12 |
|---|---|---|---|---|---|---|
| R1* | 0.0000E+00 | −7.3991E−01 | −4.8111E+00 | −5.0000E+01 | 1.2871E+02 | 4.7121E+03 |
| R2* | −8.3932E−01 | 5.8330E−01 | 2.3079E+00 | −4.1944E+01 | 1.7554E+01 | 5.0000E+02 |
| R3* | −7.9796E−01 | 8.3054E+00 | 3.5139E+01 | −4.3054E+02 | 1.7082E+03 | −5.8105E+02 |
| R4* | −7.9903E−01 | 2.4127E+00 | 5.8301E+00 | 8.8311E−01 | −1.5738E+02 | 3.7462E+02 |

In this embodiment, the first lens 11 is made from plastic with the refractive index $N_{d1}$ of 1.58 and Abbe's number $v_{d1}$ of 59.39 while the second lens 12 is made from plastic with the refractive index $N_{d2}$ of 1.69 and Abbe's number $v_{d2}$ of 31.08. The IR cut-off filter 13 is made from BK7 (a glass material name).

The f is 1.2123 mm, $f_1$ is 0.6330 mm, $f_2$ is −1.4203 mm, TL is 2.0050 mm, and BFL is 0.7250 mm, satisfying from the equations (1)~(5) and the equations (7)~(8).

| | |
|---|---|
| BFL/TL | 0.3616 |
| $N_{d1}$ | 1.58 |
| $v_{d1}$ | 59.39 |
| $N_{d2}$ | 1.69 |
| $v_{d2}$ | 31.08 |
| $f_1/f$ | 0.5221 |
| $f_2/f$ | −1.1716 |

According to the tables 5 and 6 and FIGS. 7, 8A, and 8B, the imaging lens system with two lenses can correct the aberration and can achieve the high resolution and long back focal length.

The Fourth Embodiment

Figure 9:
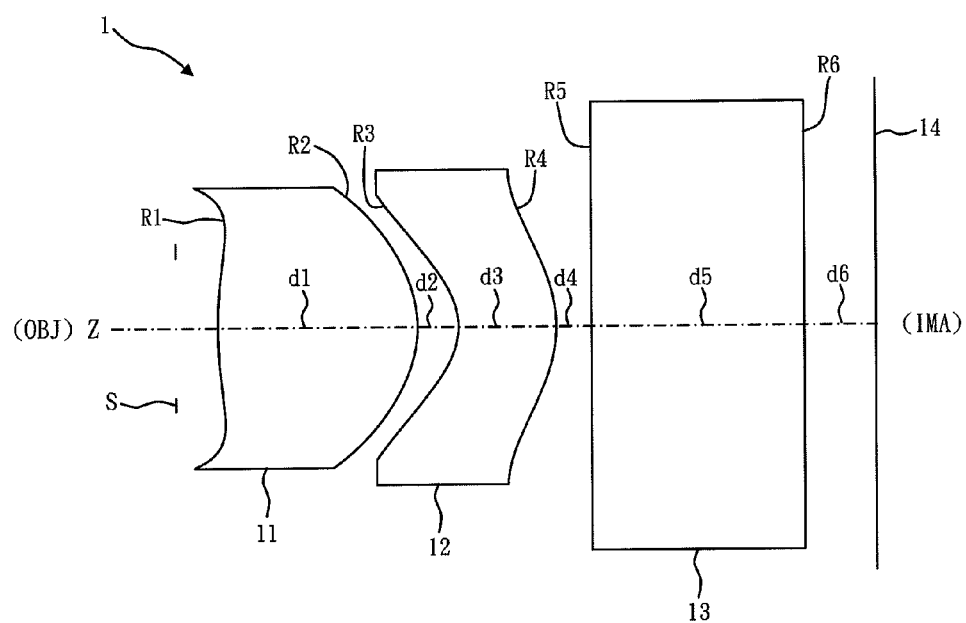
FIG. 9 is a drawing showing a structure of an image lens system with two lenses according to another embodiment of the present invention.

FIG. 9 is a drawing showing a structure of the image lens system with two lenses according to another embodiment of the present invention, wherein the first lens 11 is the same as the first lens 11 in FIG. 2.

Figure 10:
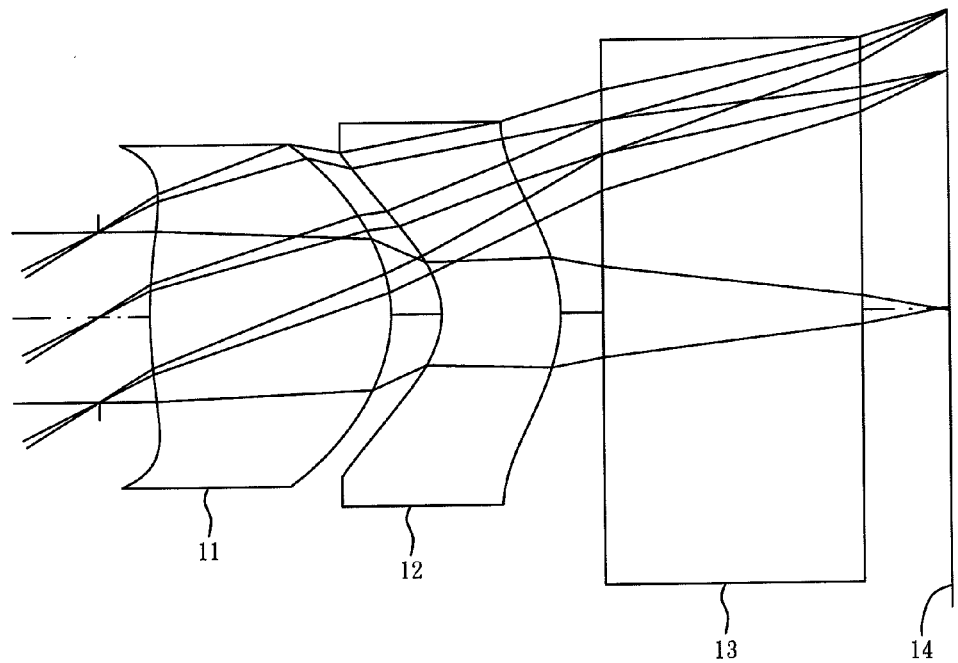
FIG. 10 is a schematic drawing showing light path of the image lens system with two lenses according to fourth embodiment of the present invention.
Figure 11A:
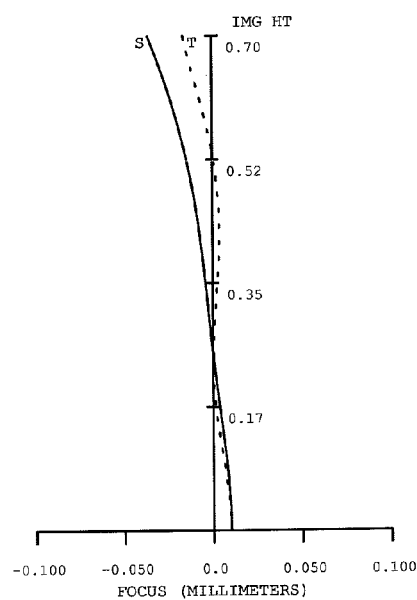
FIGS. 11A and 11B are drawings showing field curvature and distortion of an image according to the fourth embodiment of the present invention.
Figure 11B:
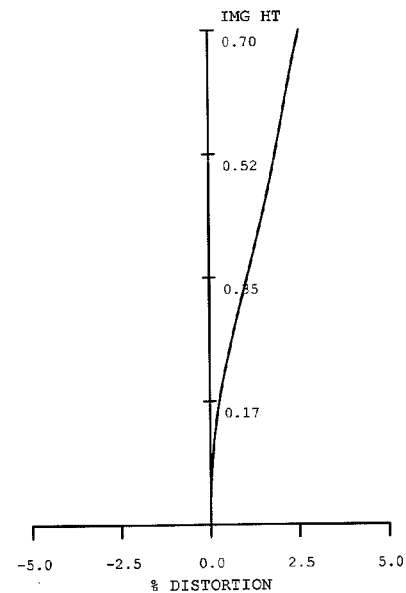

FIGS. 10, 11A and 11B are drawings showing the structure and optical path, and field curvature and distortion of the imaging lens system with two lenses, respectively.

TABLE 7

| | Fno = 2.8 | f = 1.1205 | FOV = 63.0 | |
|---|---|---|---|---|
| optical surface | radius of curvature R (mm) | spacing d (mm) | refractive index $N_d$ | Abbe's number $v_d$ |
| 1 OBJ | | 500 | | |
| STOP | | 0.1217 | | |
| 2 R1* | 1.1656 | 0.5706 | 1.58 | 59.39 |
| 3 R2* | −0.3425 | 0.1184 | | |
| 4 R3* | −0.1905 | 0.2800 | 1.69 | 31.08 |
| 5 R4* | −0.3834 | 0.1000 | | |
| 6 IR/CG | ∞ | 0.6100 | | |

TABLE 7-continued

| | Fno = 2.8 | f = 1.1205 | FOV = 63.0 | |
|---|---|---|---|---|
| optical surface | radius of curvature R (mm) | spacing d (mm) | refractive index $N_d$ | Abbe's number $v_d$ |
| 7 | | 0.2048 | | |
| 8 IMA | | | | |

*represents an aspherical surface

TABLE 8

| optical surface | k | A4 | A6 | A8 | A10 | A12 |
|---|---|---|---|---|---|---|
| R1* | 0.0000E+00 | −1.2310E+00 | −2.4340E+00 | −7.1021E+01 | −4.4242E+02 | −8.1575E−06 |
| R2* | −1.0176E+00 | 5.3247E−01 | 8.6210E+00 | −1.8757E+02 | 9.9789E+02 | −2.1565E+03 |
| R3* | −9.0818E−01 | 8.3572E+00 | 6.3688E+01 | −9.4399E+02 | 5.0703E+03 | −9.7522E+03 |
| R4* | −4.6666E−01 | 2.8882E+00 | 1.5580E+01 | −7.1870E+00 | −2.4418E+02 | 8.3769E+02 |

In this embodiment, the first lens 11 is made from plastic with the refractive index $N_{d1}$ of 1.58 and Abbe's number $v_{d1}$ of 59.39 while the second lens 12 is made from plastic with the refractive index $N_{d2}$ of 1.69 and Abbe's number $v_{d2}$ of 31.08. The IR cut-off filter 13 is made from BK7 (a glass material name).

The f is 1.1205 mm, $f_1$ is 0.5252 mm, $f_2$ is −1.3451 mm, $H_+$ is 0.5757 mm, $H_t$ is 0.56 mm, TL is 2.0055 mm, and BFL is 0.9148 mm, satisfying from the equations (1)~(8).

| | |
|---|---|
| BFL/TL | 0.4561 |
| $N_{d1}$ | 1.58 |
| $v_{d1}$ | 59.39 |
| $N_{d2}$ | 1.69 |
| $v_{d2}$ | 31.08 |
| $H_+/H_t$ | 97.27% |
| $f_1/f$ | 0.4687 |
| $f_2/f$ | −1.2004 |

According to the tables 7 and 8 and FIGS. 9, 11A, and 11B, the imaging lens system with two lenses can correct the aberration and can achieve the high resolution and long back focal length.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An imaging lens system with two lenses, along an optical axis from an object side to an image side, comprising:
   an aperture stop;
   a first lens having positive refractive power and being a biconvex lens; and
   a second lens having negative refractive power and being a meniscus lens with a concave surface on the object side and a convex surface on the image side,
   wherein the imaging lens system with two lenses satisfies an equation:

$0.36 \leq BFL/TL \leq 0.57$ wherein BFL is back focal length of the imaging lens system, and TL is distance from the aperture stop to an image plane.

2. The system as claimed in claim 1,
   wherein the first lens of the imaging lens system with two lenses satisfies equations:

$1.48 \leq N_{d1} \leq 1.61$ $53.00 \leq V_{d1} \leq 62.00$ wherein $N_{d1}$ is refractive index of the first lens, and $V_{d1}$ is Abbe's number of the first lens.

3. The system as claimed in claim 1,
   wherein the second lens of the imaging lens system with two lenses satisfies equations:

$1.58 \leq N_{d2} \leq 1.71$ $27.00 \leq V_{d2} \leq 29.00$ wherein $N_{d2}$ is refractive index of the second lens, and $V_{d2}$ is Abbe's number of the second lens.

4. The system as claimed in claim 1,
   wherein the object side of the first lens includes at least one inflection point within effective diameter range from a lens center to edge thereof; and the inflection point satisfies an equation:

$95\% \leq H_+/H_t \leq 99\%$ wherein $H_+$ is perpendicular distance from the inflection point on the object side of the first lens to the optical axis, and $H_t$ is perpendicular distance from the maximum optical effective point on the object side of the first lens to the optical axis.

5. The system as claimed in claim 1,
   wherein the imaging lens system with two lenses satisfies an equation:

$0.44 \leq f_1/f \leq 0.60$ wherein $f_1$ is effective focal length of the first lens, and f is effective focal length of the imaging lens system with two lenses.

6. The system as claimed in claim 1, wherein the imaging lens system with two lenses satisfies an equation:

$-5.20 \leq f_2/f \leq -1.00$ wherein $f_2$ is effective focal length of the second lens, and f is effective focal length of the imaging lens systems with two lenses.

7. The system as claimed in claim 1, wherein both the object side and the image side of the first lens are aspherical surfaces.

8. The system as claimed in claim 1, wherein both the object side and the image side of the second lens are aspherical surfaces.

9. The system as claimed in claim 1, wherein both the first lens and the second lens are made from plastic.

* * * * *